(12) United States Patent
Neuhof

(10) Patent No.: US 7,404,687 B2
(45) Date of Patent: Jul. 29, 2008

(54) HOLDER FOR A SUPPORT ARM SYSTEM

(75) Inventor: Markus Neuhof, Ehringshausen-Niederlemp (DE)

(73) Assignee: Rittal GmbH & Co. KG, Herborn (DE)

( * ) Notice: Subject to any disclaimer, the term of this patent is extended or adjusted under 35 U.S.C. 154(b) by 313 days.

(21) Appl. No.: 11/081,782

(22) Filed: Mar. 16, 2005

(65) Prior Publication Data

US 2005/0258322 A1 Nov. 24, 2005

(30) Foreign Application Priority Data

Apr. 16, 2004 (DE) .................. 10 2004 019 042

(51) Int. Cl.
*F16B 1/00* (2006.01)
*F16B 9/00* (2006.01)
*F16L 41/00* (2006.01)

(52) U.S. Cl. ...................... 403/119; 403/205

(58) Field of Classification Search ............... 403/205, 403/206, 231, 331, 403, 119; 285/179.1, 285/184

See application file for complete search history.

(56) References Cited

U.S. PATENT DOCUMENTS

| | | | | |
|---|---|---|---|---|
| 1,579,648 A | * | 4/1926 | Crickmer | 285/123.8 |
| 3,342,457 A | * | 9/1967 | Bobrowski | 256/21 |
| 3,420,558 A | * | 1/1969 | Whitten, Jr. | 403/24 |
| 3,847,388 A | * | 11/1974 | Bretche | 403/362 |
| 4,227,688 A | * | 10/1980 | Senoh et al. | 482/38 |
| 5,571,211 A | * | 11/1996 | Hiemisch et al. | 623/38 |
| 6,467,230 B1 | * | 10/2002 | Perkins et al. | 52/655.1 |
| 6,848,679 B2 | * | 2/2005 | Higgs et al. | 256/65.14 |
| 2003/0094604 A1 | * | 5/2003 | Higgs et al. | 256/65.01 |

FOREIGN PATENT DOCUMENTS

DE          43 31 125 C2    3/1996

OTHER PUBLICATIONS

*Systems for the Human/Machine Interface*, Rittal Handbuch 29, p. 162.

* cited by examiner

*Primary Examiner*—Daniel P. Stodola
*Assistant Examiner*—Nahid Amiri
(74) *Attorney, Agent, or Firm*—Pauley Petersen & Erickson

(57) ABSTRACT

A holder for a support arm system having a fastening section with a receptacle into which a profiled support element is inserted and fastened on the holder. The holder contains one or several compensating elements for aligning the profiled support element and the receptacle has a support section, at least some portions of which are matched to an exterior circumference of the profiled support element. For making possible a simple and continuous adjustment of the profiled support element for compensating deformation under load, the receptacle has, directly or indirectly adjoining the support section, a regulating area which is wider in cross section than the support section and into which the profiled support element extends. The support section together with the regulating area forms a pivot seating for the profiled support element.

14 Claims, 1 Drawing Sheet

HOLDER FOR A SUPPORT ARM SYSTEM

CROSS REFERENCE TO RELATED APPLICATION

This application claims the benefit of German Patent Reference 10 2004 019042.9-26, filed 16 Apr. 2004, corresponding to this invention, and its teachings are incorporated by reference herein.

BACKGROUND OF THE INVENTION

1. Field of the Invention

This invention relates to a holder for a support arm system having a fastening section with a receptacle into which a profiled support element is inserted and fastened on the holder, wherein the holder contains one or several compensating elements for aligning the profiled support element, and the receptacle has a support section, at least some portions of which are matched to an exterior circumference of the profiled support element.

2. Discussion of Related Art

An angle piece for a suspension device is known from German Patent Reference DE 43 31 125 C2, in which a receptacle is cut out for fixing a support arm, which is substantially oval in cross section, in place on a support arm fastening wall. The receptacle is an annular shoulder projecting away from the support arm fastening wall. The receptacle has a flat face on which the support arm is supported flush at its flat end. The securing of the support arm is provided by fastening screws which are inserted into fastening receivers cut into the support arm fastening walls and which can be screwed into aligned screw-in channels of the support arm.

With such support arm systems, the support arm system is deformed in the elastic range by a load, for example by a suspended housing for receiving a control unit. It is not possible to compensate for this lowering by the known receptacle for the support arm.

To avoid this disadvantage, solutions are known, for example, from the Rittal catalog "Systems for the Human/Machine Interface", in accordance with which the horizontal alignment of the support arm under the predicted load occurs by the insertion of small plates or partial radii between the end of the support arm and the surface against which the support arm rests. Thus, the support arm intentionally rests against an inclined surface and, without a load, extends obliquely upward, by which the lowering under a load is compensated.

SUMMARY OF THE INVENTION

It is one object of this invention to provide a holder of the type mentioned above but which makes possible the simple and continuous adjustment of the profiled support element for compensating a deformation under load.

In accordance with this invention, this object is attained with a receptacle having, directly or indirectly adjoining the support section, a regulating area, which is wider in cross section compared to the support section and into which the profiled support element extends. The support section, together with the regulating area, forms a pivot seating for the profiled support element.

With this arrangement, the profiled support element is securely seated on the support section. The widening of the cross section in the regulating area makes it possible for the inserted profile support element to be pivoted over an angle which is only limited by the selected widening of the regulating area and differs from the center axis of the receptacle, and can be aligned corresponding to the deformation of the profiled support element by a load suspended therefrom, which is compensated.

In one embodiment of this invention, the support section extends around the outer circumference of the profiled support element, the support section has a sealing receptacle which receives a seal, and the seal rests sealingly against the outer circumference of the profiled support element. The seal thus lies in the plane of rotation of the profiled support element and is continuously guided by the support section and the sealing receptacle. During alignment, the profiled support element undergoes only a rotatory movement in this area, and no or only a small transverse movement. Therefore the seal only needs to compensate small changes of the gap to be bridged between the profiled support element and the support section, which results in a long service life and a good sealing effect, even with a maximally deflected profiled support element.

Because at least one actuating member fixes the profiled support element in place in the regulating area, the selected orientation of the profiled support element is maintained even when the support arm system is under a load. Fixation by a variable actuating member makes it possible to hold the profiled support element in every deflected position within the regulating area.

If the actuating member has a tool receptacle which is accessible from the exterior of the holder and by which the actuating member can be displaced with respect to the profiled support element, the adjustment of the holder can be performed when it is inserted into the holder. The alignment of the profiled support element can be performed with little cost because the profiled support element does not need to be taken out of the holder for changing the orientation of the profiled support element.

In a cost-effective and easily manipulated embodiment of this invention, the actuating member is a screw which is screwed into a threaded receptacle of the holder. By turning the screw, the profiled support element is pushed ahead of the screw in the regulating area which, translated by resting against the support section, leads to the pivoting of the profiled support element outside of the holder.

If two actuating members are arranged at oppositely located areas of the circumference of the profiled support element in the regulating area, the alignment of the profiled support element can be fixed independently of the suspended load or the inherent weight of the profiled support element. The profiled support element is thus securely held between the two actuating members without a resulting restriction of the adjustment options. A change in the action of the force on the profiled support element does not lead to any change in alignment of the profiled support element inside the holder.

In a preferred embodiment of this invention, a fixation piece is arranged in the regulating area or near the support section, which fixes the profiled support element on an outer circumference in a non-positive and/or a positive manner. In this case the fixation piece prevents the profiled support element from being pulled out of the holder while in the mounted state. In contrast to the actuating member, which is intended to make possible the accurate adjustment of the profiled support element, the fixation piece can be optimized so that it provides sufficient force for holding the profiled support element.

Because the regulating area in the pivot direction of the profiled support element is widened in cross section with respect to the cross section of the profiled support element and is matched to the cross section of the profiled support element transversely to the pivot direction, a lateral guidance of the profiled support element is achieved, which prevents the lateral yielding of the profiled support element. This arrangement also assures that the profiled support element is in the correct position with respect to the actuating member or actuating members, as well as to the fixation piece, and thus can be securely adjusted and fixed in place. The adjusting options in the pivot direction are not thus hindered.

In one embodiment, the profiled support element has a round outer geometry, and the regulating area an elliptical inner contour, wherein the large semi-axis of this inner contour is arranged in the pivot direction of the profiled support element. Thus the profiled support element can be particularly well sealed in the area of or near the support section matched to the outer circumference of profiled support element. With its lateral guidance, the elliptical inner contour causes the round profile, which is to be fixed centered, to be positioned exactly opposite the actuating members and fixation pieces, while assuring the maximally possible deflection of the profiled support element in the pivot direction, which is predetermined by the regulating area.

BRIEF DESCRIPTION OF THE DRAWING

This invention is explained in greater detail in view of an exemplary embodiment represented in the drawing.

DESCRIPTION OF PREFERRED EMBODIMENTS

Figure 1:
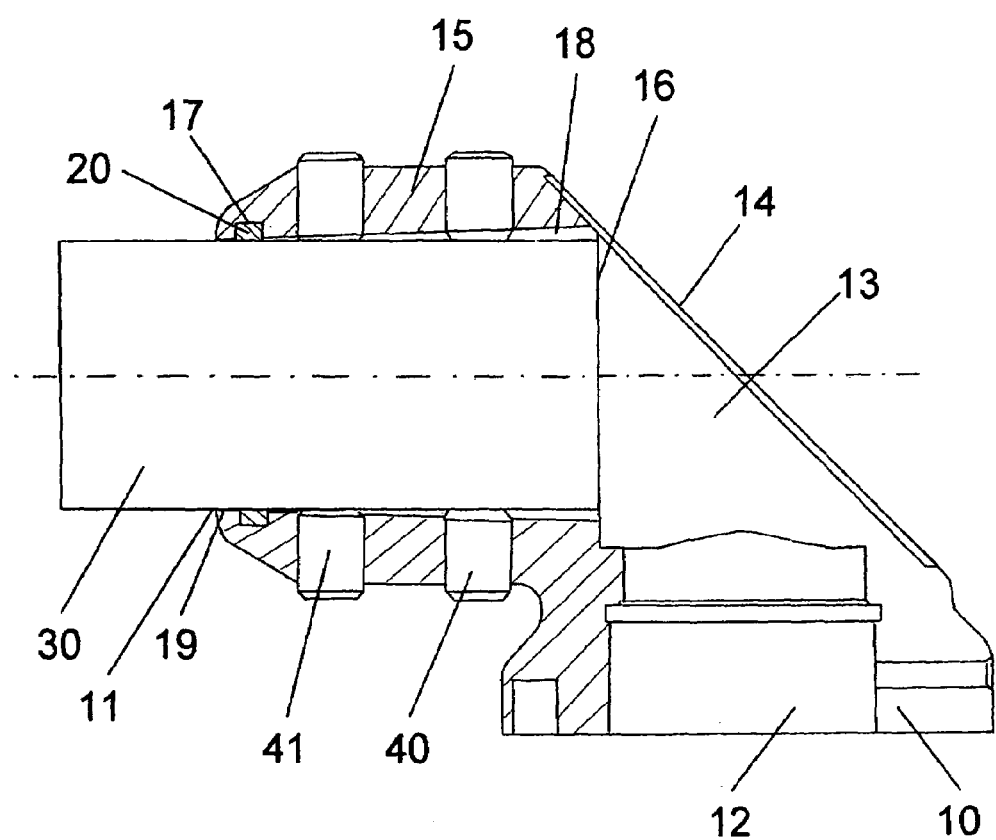
FIG. 1 shows a sectional view of the holder for a support arm system.

A sectional view of the holder 10 for a support arm system, into which receptacle a profiled support element 30 is inserted, is shown in FIG. 1. In this case the holder 10 is embodied as an angle piece. However, within the meaning of this invention the holder 10 can also be embodied as a flange, a joint or other component for receiving a profiled support element. The receptacle 11 has a contact face 16, by which the profiled support element 30 is limited in its penetration depth into the receptacle 11.

The receptacle 11 adjoins a support section 19, starting at which the cross section of the receptacle 11 widens in comparison to the cross section of the support section 19. This widening of the receptacle 11 has the shape of an ellipse, wherein the large semi-axis of the ellipse lies in the pivot direction of the inserted profiled support element 30. The small semi-axis of the ellipse corresponds to the cross section of the profiled support element 30, or the cross section of the support section 19. With this design of the receptacle 11, the inserted profiled support element 30 is precisely laterally guided, and in the pivot direction a deflection over the entire regulating area 18 is continuously possible. It is also possible to insert circular profiled support elements 30 from the direction of the contour.

A U-shaped sealing receptacle 17, into which a seal 20 is integrated is provided in the area of or near the support section 19. With the profiled support element 30 inserted, the seal 20 rests sealingly against the outer circumference of the profiled support element 30. If the profiled support element 30 is deflected, the seal 20, together with the support section 19, forms the plane of rotation of the profiled support element 30. In this area the profiled support element 30 only undergoes a rotatory movement, which has no negative effect on the sealing function of the seal 20.

An actuating member 40 and a fixation piece 41 are respectively arranged from above and below in the fastening section 15 of the holder 10. Here, the actuating members 40 and the fixation pieces 41 are screws.

The adjustment of the profiled support element 30 over the entire regulating area 18 is possible with the actuating members 40. With a thread cut into the passage of the actuating member 40 in the holder 10, the adjustment can be performed without removal of the profiled support element 30 from the holder 10.

For fixing the profiled support element 30 in place, or for preventing the unintentional pulling-out of the profiled support section 30 from the receptacle 11, the profiled support section 30 is held non-positively and/or positively on its outer circumference in a known manner by the fixation pieces 41.

Together with the walls of the holder 10, the contact face 16 and the contact face of the receptacle 11 enclose a cable distribution chamber 13. The cable distribution chamber 13 is accessible via an obliquely extending cover 14. Thus, cables to be introduced can be placed, fastened and passed on in a very simple manner. The cover 14 can be closed again by fastening screws and corresponding screw receptacles.

A vertical receptacle 12 adjoins the cable distribution chamber 13. The adjoining element of the support arm system, for example in the form of a vertically arranged profiled support element, can be inserted there.

What is claimed is:

1. A holder (10) for a support arm system comprising:
a fastening section with a receptacle (11) into which a profiled support element (30) is inserted and fastened on the holder (10), wherein the receptacle (11) has a support section (19) matched to and in contact with an outer circumference of the profiled support element (30),
the receptacle (11) having a regulating area (18), adjoining the support section (19), the regulating area (18) being wider in cross section than the support section (19) and into which the profiled support element (30) extends,
wherein the support section (19) with the regulating area (18) forms a pivot seat for the profiled support element (30), and
at least one actuating member (40) disposed in a plane of a pivot direction within the receptacle (11), wherein the at least one actuating member (40) fixes the profiled support element (30) in place in the regulating area (18).

2. The holder in accordance with claim 1, wherein the support section (19) extends around the outer circumference of the profiled support element (30), the support section (19) comprising a seal (20) within a sealing receptacle (17) and resting sealingly against the outer circumference of the profiled support element (30).

3. The holder in accordance with claim 1, wherein the at least one actuating member (40) has a tool receptacle accessible from an exterior of the holder by which the at least one actuating member (40) is displaceable with respect to the profiled support element (30).

4. The holder in accordance with claim 3, wherein the at least one actuating member (40) is a screw which is screwed into a threaded receptacle of the holder (10).

5. The holder in accordance with claim 4, wherein two of the actuating members (40) are arranged at oppositely located areas of the circumference of the profiled support element (30) in the regulating area (18).

6. The holder in accordance with claim 5, wherein a fixation piece (41) is arranged in one of the regulating area (18) and an area of the support section (19) which fixes the profiled support element (30) on the outer circumference in at least one of a non-positive manner and a positive manner.

7. The holder in accordance with claim 6, wherein the regulating area (18) is widened in the pivot direction of the profiled support element (30) in cross section with respect to a cross section of the profiled support element (30) and is matched to the cross section of the profiled support element (30) transversely to the pivot direction.

8. The holder in accordance with claim 7, wherein the profiled support element (30) has a round outer geometry, the regulating area (18) has an elliptical inner contour, and a major semi-axis of an inner contour is arranged in the pivot direction of the profiled support element (30).

9. The holder in accordance with claim 1, wherein the at least one actuating member (40) is a screw which is screwed into a threaded receptacle of the holder (10).

10. The holder in accordance with claim 1, wherein two of the actuating members (40) are arranged at oppositely located areas of the circumference of the profiled support element (30) in the regulating area (18).

11. The holder in accordance with claim 1, wherein a fixation piece (41) is arranged in one of the regulating area (18) and an area of the support section (19) which fixes the profiled support element (30) on the outer circumference in at least one of a non-positive manner and a positive manner.

12. The holder in accordance with claim 1, wherein the regulating area (18) is widened in the pivot direction of the profiled support element (30) in cross section with respect to a cross section of the profiled support element (30) and is matched to the cross section of the profiled support element (30) transversely to the pivot direction.

13. The holder in accordance with claim 1, wherein the profiled support element (30) has a round outer geometry, the regulating area (18) has an elliptical inner contour, and a major semi-axis of the inner contour is arranged in the pivot direction of the profiled support element (30).

14. A holder (10) for a support arm system, the holder comprising:
- a fastening section with a receptacle (11) into which a profiled support element (30) is inserted and fastened on the holder (10);
- the receptacle (11) having a support section (19) and a regulating area (18) adjoining the support section (19), the support section (19) having a portion matched to and extending around the outer circumference of the profiled support element (30), and the regulating area (18) being wider in cross section than the support section (19) and into which the profiled support element (30) extends;
- the support section (19) including a sealing receptacle (17) and a seal (20) disposed in the sealing receptacle, the seal (20) resting sealingly against the outer circumference of the profiled support element (30);
- the support section (19) with the regulating area (18) forming a pivot seat for an end of the profiled support element (30), wherein the end of the profiled support element (30) rotates about an axis at the support section (19); and
- at least one actuating member (40) in combination with the end of the profiled support member (30) for fixing the profiled support element (30) in place in the regulating area (18).

\* \* \* \* \*